United States Patent [19]
Pech et al.

[11] 3,952,518
[45] Apr. 27, 1976

[54] DEVICE FOR THE TRANSMISSION OF FORCES IN BRAKE BOOSTERS

[75] Inventors: Franz Pech, Neu-Isenburg; Armin Lauterwasser; Horst Quitmann, both of Frankfurt am Main, all of Germany

[73] Assignee: ITT Industries, Inc., New York, N.Y.

[22] Filed: June 22, 1972

[21] Appl. No.: 265,135

[30] Foreign Application Priority Data
July 20, 1971  Germany............................ 2136252

[52] U.S. Cl........................................ 60/553; 91/1; 91/369 B
[51] Int. Cl.² ............................................ F15B 9/10
[58] Field of Search............... 91/369 B; 60/54.5 P, 60/552, 553, 54.6 P

[56] References Cited
UNITED STATES PATENTS

| | | | |
|---|---|---|---|
| 2,828,719 | 4/1958 | Ayers | 91/369 B |
| 2,900,963 | 8/1959 | Ayers | 91/369 B |
| 2,949,892 | 8/1960 | Ayers | 91/369 B |
| 3,175,235 | 3/1965 | Randol | 60/54.6 P |
| 3,183,789 | 5/1965 | Stelzer | 91/369 B |
| 3,385,168 | 5/1968 | Fineman et al. | 91/369 B |

Primary Examiner—Paul E. Maslousky
Attorney, Agent, or Firm—John T. O'Halloran; Menotti J. Lombardi, Jr.; Alfred C. Hill

[57] ABSTRACT

This invention relates to a plurality of two-arm levers employed in brake boosters for summing the control force applied by the brake pedal and the booster force applied by the brake booster and for transmitting the resultant sum of forces to the hydraulic system actuation device. The two-arm levers are interconnected in the range of their balancing point or between their balancing point and their inner radial end by an elastic connection. This arrangement of two-arm levers provides one piece that improves the assembly of the two-arm levers in a brake booster.

35 Claims, 20 Drawing Figures

DEVICE FOR THE TRANSMISSION OF FORCES IN BRAKE BOOSTERS

BACKGROUND OF THE INVENTION

The invention relates to a device for the force transmission in brake boosters where the control force and the boosting force are added up and transmitted to the hydraulic system actuation device by means of radially arranged levers.

In particular, in the case of vacuum boosters, it is known to provide radially arranged levers for the transmission of the control force, on the one hand, and of the pneumatic boosting force, on the other hand, to the actuation device.

In the German Pat. DOS No. 1,430,633 a vacuum booster is described which has a cup-shaped cylinder, a cover fixed thereon, and a piston displaceable therein. Via three radially disposed levers in piston rests on a disc with an actuation rod for an oil pressure cylinder and on a sleeve which is slipped on to a control rod projecting through the central opening of the piston. The radially disposed levers are designed as two-arm levers, at the inner ends of these levers which face one another the control force generated by the driver being applied via the control rod and the slipped-on sleeve and at the outer ends of these levers the boosting force is applied which acts on the piston which is displaceable in the cup-shaped cylinder. The balancing point of the levers lies on an imaginary circle of the disc connected with an actuation rod of the oil pressure cylinder. The vectors of the control force and of the boosting force at first are summed up at any of the individual levers to form a force vector which in the balancing point of the lever is vertically directed to the above-mentioned disc. Since the imaginary circle on this disc on which the balancing points of all the levers provided are situated lies concentrically in respect of the actuation rod of the oil pressure cylinder and since the forces becoming effective at the various levers are equal components of the control force and the boosting force the total vector of the forces transmitted to the actuation rod exactly lies on the imaginary axis of the imaginary circle.

This arrangement of the levers at the same time forms the reaction element which substitutes the reaction disc or reaction diaphragm, respectively, of other designs and which by means of the ensuing reaction force which is transmitted to the control element actuated by the driver correspondingly gives the driver a feeling for the total braking force actually generated.

The disadvantage of this arrangement and of similar ones is that the insertion of the individual levers means a complicated and time-consuming assembling operation. With regards to boosters with different transmission ratios, correspondingly, there exist differently designed levers as the balancing points and the lever arms of the levers must change if the transmission ratio is to be varied. Therefore, upon insertion of the individual levers there will be often a faulty assembly because of assembling levers of the type referred to with varying transmission ratios in a booster, therefore, the operability of the booster is disturbed.

The British Pat. No. 979,418 describes a vacuum booster where for the purpose of functionally distributing the forces which become effective in different ways there is also provided levers in a radial arrangement which is concentric to the control and actuation devices. Here, the control force and the boosting force which become effective on a wall-shaped piston provided in the housing by means of pressure differences are also transmitted to the actual actuation system of the hydraulic system by means of radially disposed levers. A transmission element of the control piston will abut the radially inner free ends of the levers upon the actuation of the system. The radially outer ends of the levers are interconnected as well as connected with a ring element by means of a rubber ring vulcanized to the outer ends of the levers. Via this rubber ring the levers abut a hub element connected with the wall-shaped piston so that the boosting force will apply to just these outer ends. A reaction ring of elastic material is provided on the hub element at a certain radial distance from the outer ends of the levers, the flat-shaped levers resting on said reaction ring. An annular transmission element receives the control and boosting forces at the opposite ends of the levers and transmits these forces summed to the actuation device of the hydraulic system.

As regards the assembly, here, the levers to be inserted are connected with one another by means of the rubber ring vulcanized to their outer ends. However, handling the levers when inserting them will be rather complicated. Admittedly, the danger of faulty assembly will be reduced by a certain amount, but because of the interconnection of the levers at their outer ends, the inner ends remaining entirely free. Thus, a structural element will result which in its entirely will be extremely flexible and unstable and which for the insertion requires even more handiness than the levers which are to be inseted separately.

The connection of the levers at their radially outer ends by means of a rubber ring vulcanized to them, however, was not meant to be a help in the assembly by the inventor of the above-described system.

SUMMARY OF THE INVENTION

It is, therefore, the object of the present invention to provide an arrangement for facilitating the assembly of the radially disposed levers, for rendering the assembly less time-consuming, and to eliminate faulty assembly.

A feature of the present invention is the provision of a device for the transmission of forces in brake boosters comprising: a brake booster housing having a longitudinal axis; a control means disposed coaxially of the axis; a servo motor disposed coaxially of the axis and in a cooperative relation with the control means; a hydraulic system actuation device disposed coaxially of the axis; and a plurality of two-arm radially disposed levers disposed coaxially of the axis and in a cooperative relationship with the servo motor and the actuation device to sum up the control force of the control means and the boosting force of the servo motor and to transmit the resultant sum of the forces to the actuation devices, each arm of the plurality of two-arm levers being interconnected by an elastic connection at a point radially spaced from the outer edges of the arms to form a preassembled single structural element.

Another feature of the present invention is the provision of the above described device where the point of applying the control force to each arm of the plurality of two-arm levers are disposed in a plane and on a first given circular arc in the plane; the point of applying the boosting force to each arm of the plurality of two-arm levers are disposed in the plane and on a second given circular arc in the plane different than the first given arc; and the blancing point of each arm of the plurality of two-arm levers are disposed in the plane and on a third given circular arc in the plane different than and between the first and second given arcs.

Each arm of the plurality of two-arm levers are sector-shaped or circular-sector-shaped the ends of each sector-shaped arms coupled with the control piston are truncated and the edges of the sector-shaped arms are more or less bent or kinked in a predetermined direction a predetermined amount.

The elastic connection for each arm of the plurality of two-arm levers are disposed adjacent the balancing point of each of the lever arms, or between the balancing point and the point of applying the control force of each of the lever arms.

In one embodiment of the invention the structural element formed by the radially disposed levers interconnected by webs is blanked altogether from strip spring steel and the balancing point and the point of applying the boosting force are formed by bulgings pointing in opposite directions. The same structural element may also be manufactured as fine steel casting.

In a second embodiment of the invention the levers are separately blanked and shaped from strip spring steel. Between the balancing point and the point of applying the control force each arms of all the levers have a circular aperture lying on their radial axis. At the inclined sector edges each arm of the levers are provided with circular cut out disposed on a circular arc containing the apertures. Each arm of all the levers are slipped or buttoned onto a guide ring of plastic provided with fungiform projects and plane projections, the fungiform projections engaging the apertures and, the plane projections engaging the circular cut outs. The fungiform projections are made elastic by means of a slot on the outer surface thereof.

The guide ring preferably consists of polyamide.

In a third embodiment of the invention each arm of all the levers are separately manufactured as fine steel castings. The balancing point and the application point of the boosting force are formed by cast toruses. Between the balancing point and the point of applying the control force each arm of all the levers has a cast hook-like projection situated on its axis while the sector edges of each arm of all the levers are provided with claw-like projections. The hook-like projections and the claw-like projections are all situated on a circular arc and a retaining ring, which is preferably made from spring steel is inserted into said hook-like and claw-like projections.

The retaining ring is slightly bent like a coil.

After the insertion of the retaining ring the claw-like projections are slightly compressed.

According to another embodiment of the invention each arm of all the levers are cut off and shaped from sectional bar steel.

The interconnection of each arm of all the levers is effected by an annular foil which may be of plastic, rubber or metal.

The annular foil may be provided with a marking for the entire preassembled structural element by being colored differently or having a number, for instance.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENTS

Figure 1:
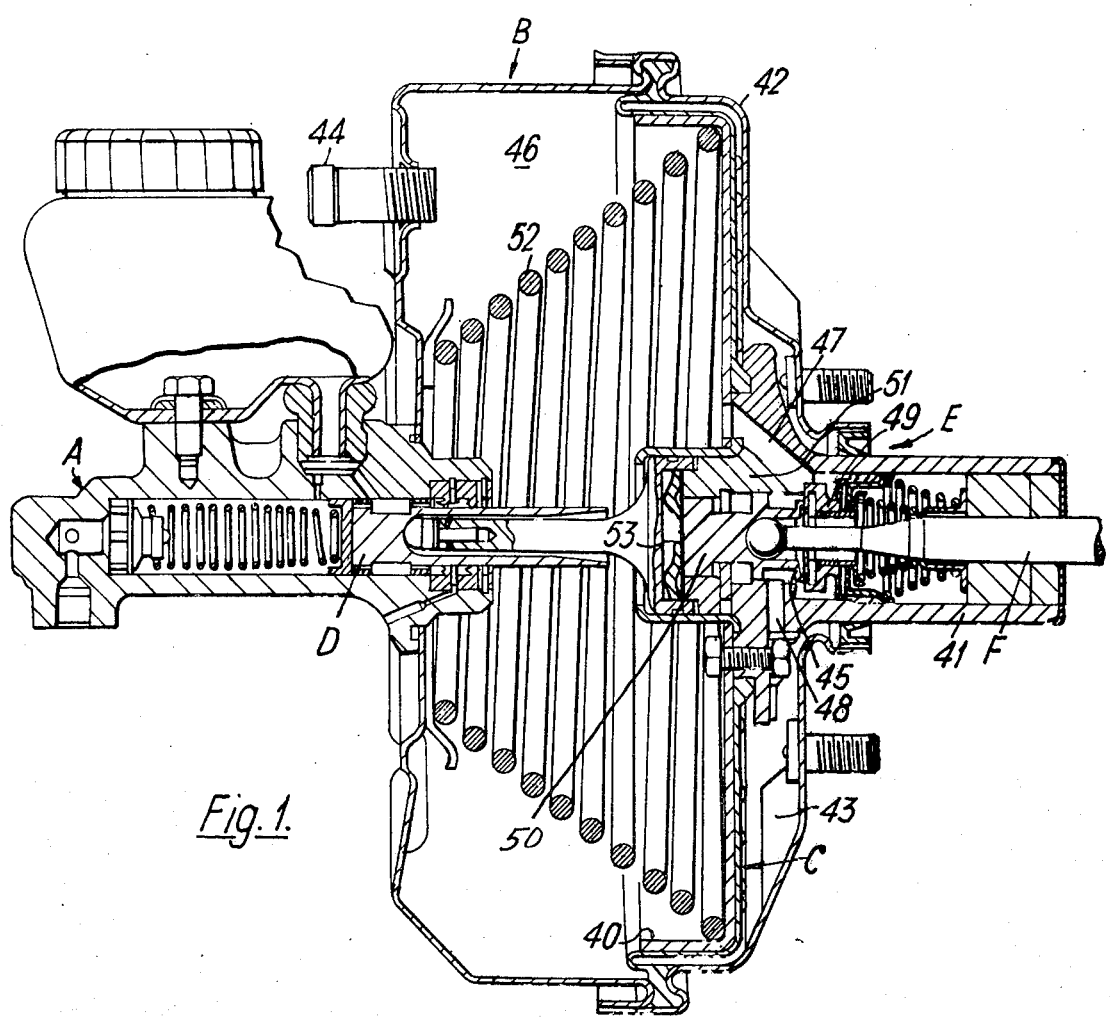
FIG. 1 is a cross-sectional view of a brake booster incorporating a plurality of two-arm levers in accordance with the principles of the present invention.

The brake booster shown in FIG. 1 comprises a hydraulic master cylinder A which is bolted to the front end of a fluid pressure servo motor B having a power piston C therein which is adapted to drive or force a fluid displacement member D into the hydraulic master cylinder A to displace fluid thereby. Actuation of the fluid pressure servo motor B is controlled by a control valve structure E which is carried by the power piston C and which in turn is controlled by a push rod F that extends through the cover plate on the rear of the servo motor B and which in turn is adapted to be moved by the brake pedal lever of an automotive vehicle.

The power piston C is formed by means of left and right piston sections 40 and 41, which are bolted together to retain a diaphragm 42 on its outer periphery. The fluid pressure servo motor B is an atmospheric submerged one in which vacuum is provided on both sides of the power piston C during its normal deactuated condition and is actuated by the connection of atmospheric pressure to the power chamber 43 on the right side of the power piston C. Vacuum for the actuation of servo motor B is usually obtained from the manifold of the vehicle in which it is mounted, and is conducted through a flexible hose and the small pipe 44 into the left chamber 46 of servo motor B and through conducts 47 and 48 in section 41 of power piston C to right chamber 43.

The passage of actuation medium through conducts 47 and 48 is controlled by control valve E comprising an annular poppet member 49 and a control member 50 connected to push rod F. In the normal deactuated position poppet member 49 rests on the seating flange 45 of retracted control member 50 to close the inlet passage for the atmosphereic pressure and to form an annular gap with seating flange 51 of section 41 of the power piston C to open the passage through conducts 47 and 48.

Actuation of servo motor is initiated by the despressing of the brake pedal lever (not shown) whereupon control member 50 is moved axially to the left to cause poppet member 49 to abut seating flange 51 in piston section 41 and thereby separate the power chamber 43 from vacuum chamber 46. Further movement of control member 50 causes control member 50 to be disengaged from poppet member 49 to connect power chamber 43 through passage 48 with atmospheric pressure. Increase in pressure would then be delivered in power chamber 43 causing power piston C to be moved to the left and the fluid displacement member D to be forced into the pressurizing chamber of the hydraulic master cylinder A thereby initiating a brake application of the vehicle. When the desired intensity of the brake application is reached further movement of pushrod F is stopped. Thereupon power piston C continues to move annular poppet member 49 into engagement with seating flange 45 of control member 50, and thereby prevents a further increase in pressure within power chamber 43.

If the operator desires to reduce the braking effort pushrod F is retracted or permitted to move to the right whereupon annular poppet member 49 is lifted from vacuum valve seat 51 to thereafter connect vacuum from pressure chamber 46 to power chamber 43 through conduct passages 47 and 48 to thereby decrease the pressure differential across power piston C. The hydraulic pressure within the master cylinder and the return spring 52 between the front of servo motor B and power piston C causes displacement member D and power piston C to be moved to the right to follow the retracting movement of control member 50 until the normal deactuated position is reached.

The levers 53 are bent towards displacement member D and are biased with their radial outer ends on power piston C and with their radial inner ends on control member 50. When the booster is actuated the force of control member 16 and the force of power piston C are summed up by levers 53 and the resultant sum of forces is transmitted by levers 53 to the fluid displacement member D. Since levers 53 tend to tilt, a reaction force is transmitted to control member 50 and through push rod F onto the brake pedal so that the operator is always informed about the degree of actuation.

Figure 2A:
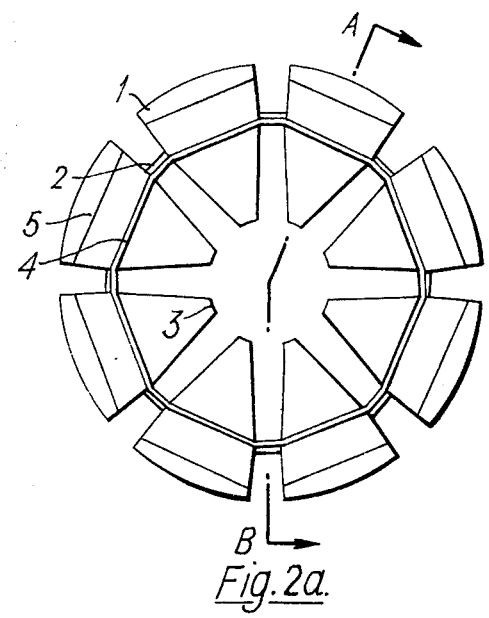
FIGS. 2a–2c illustrate various views of a first embodiment of a plurality of two-arm levers in accordance with the principles of the present invention which can be employed in a brake booster similar to the brake booster of FIG. 1.

FIG. 2a illustrates a one-piece reaction element (two-arm lever) for assembly in a brake booster similar to the brake booster of FIG. 1 in the place of levers 53. The operation of this reaction element corresponds to the levers described hereinbefore under the heading "Background of the Invention" and is radially disposed between the control piston and the actuating piston of the brake booster.

The inventive reaction element of this embodiment consists of several circular-sector-shaped portions 1 — in the illustrated embodiment of eight portions 1 — which take over the force-transmitting action of the levers and which are interconnected in a circular plane by means of webs 2. The point of each arm 1 of the plurality of two-arm levers coupled to the control piston is formed with truncated ends 3 which upon assembly are disposed concentric with the axis of the control piston. The balancing point 4 of the arms 1 of the two-arm levers and the point 5 to which is applied the boosting force are formed by bulges 6 and 7 pointing in opposite directions and provided in the radial outer half of arms 1. This will be clearly seen from FIG. 2b which shows a section taken along the line A–B of FIG. 2a. It should be noted that the central portion is kinked or bent in a predetermined direction a predetermined amount. FIG. 2c illustrates the detail of that portion of FIG. 2b circled on an enlarged scale.

When assembled, truncated ends 3 of the circular-sector-shaped arms 1 are in engagement with the control piston of the booster. The radially outward disposed application point 5 is abutted by the wall-shaped piston which transmits the servo or booster force while the balancing point 4 of any of arms 1 rests against the structural element which transmits the control force and the boosting force to the actuating piston.

The relation of the distances from the application point 3 to the balancing point 4 and from the application point 5 to the balancing point 4 determines the respective transmission ratio of the respective reaction element.

The application points 3 and 5 and the balancing point 4 of the individual circular-sector-shaped arms are disposed one above the other in one plane at a time. The sector edges of the arms are kinked in a manner so that arm 1 will taper at an increased rate towards the central point as seen from adjacent the balancing point 4.

Figure 2B:
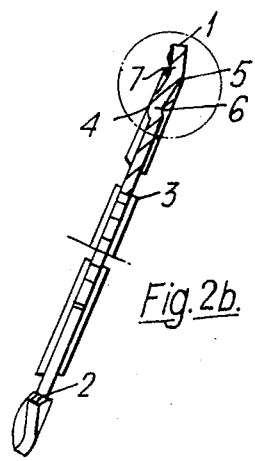
Figure 2C:
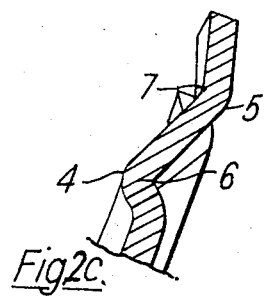

The reaction element of FIGS. 2a to 2c preferably is a one-piece blanking from strip spring steel. In the following steps of making the reaction element bulges 6 and 7 are shaped and subsequently the structural reaction element will be quenched and tempered.

However, this embodiment of the inventive reaction element may be also cast in one piece as a fine steel casting.

Figure 3A:
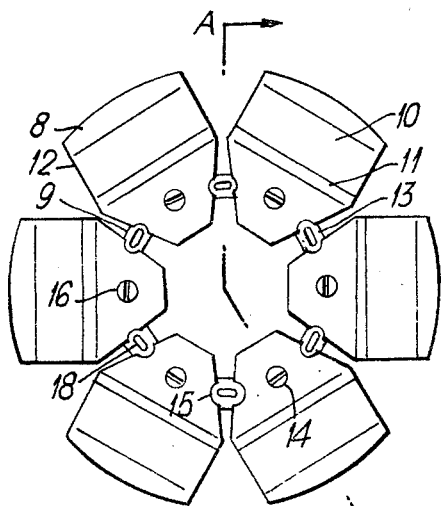
FIGS. 3a–3e illustrate various views of a second embodiment of a plurality of two-arm levers in accordance with the principles of the present invention which can be employed in a brake booster similar to the brake booster of FIG. 1.
Figure 3B:
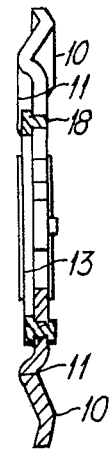

FIG. 3a illustrates another embodiment of the inventive reaction element which consists of several individual sector-shaped lever arms 8 which are disposed in a circular plane and which are concentrically arranged with respect of the axis of the control piston. In the illustrated example the number of the individual lever arms 8 is six. When assembled, the truncated ends 9 of the sector-shaped lever arms 8 are again in engagement with the control piston of the brake booster and correspondingly form the application point for the control force. The application point 10 for the boosting force and the balancing point 11 of the lever arms 8 again are formed by bulges at the radially outer half of the lever arms 8 which are preferably blanked from strip spring steel for springs, said bulges pointing in opposite directions. This will be illustrated more clearly by the section of FIG. 3b taken along line A–B of FIG. 3a. The arms are again which is kinked in the central portion. The sector edges 12 of the lever arms 8 in the illustrated embodiment are bent off outwards adjacent the balancing point 11, parallel to the radius, so that the levers cannot impede one another. According to the invention, before the assembly in the brake booster, the sector-shaped lever arms are connected by a guide ring 13. Said guide ring 13 consists of plastic, preferably of polyamide, and keeps the lever arms 8 interconnected by means of a snap-fastener-like connection so that the entire reaction element again is to be treated as one single structural element during assembly.

Figure 3C:
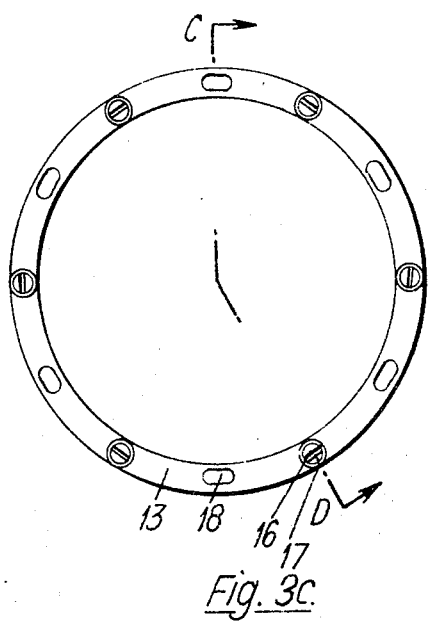
Figure 3D:
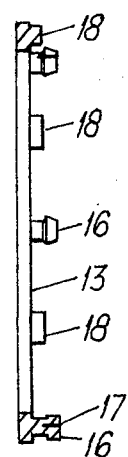
Figure 3E:
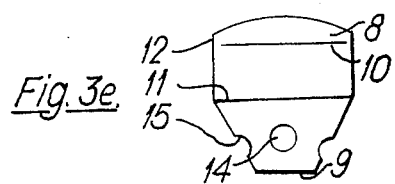

According to FIG. 3e the individual sector-shaped lever arms 8 have a circular aperture 14 provided on the radially inner half and on the axis of the sector-shaped lever arms 8. Further at the inclined sector edges circular cuttings or cut outs 15 are provided which together with apertures 14 lie on a circular arc. The apertures 14 and cut outs 15 of lever arms 8 all are situated on a common circle which corresponds to guide ring 13. According to FIGS. 3c and 3d guide ring 13, on its annular surface, is alternatively provided with fungiform projections 16 and with plain projections 18 disposed at regular intervals and in accordance with the number of the sector-shaped lever arms 8. Projections 16 are given elasticity by means of a slot 17 in its outer surface. Projections 18 are laterally rounded off and extend on a circular arc of the annular surface.

By means of their elasticity the fungiform projections 16 are buttoned into circular apertures 14 of lever arms 8, the projections 18 coming into mesh with an associated one of the circular cut outs 15 of two adjacent lever arms 8 at a time. The sector-shaped lever arms 8 are safely held in a circular plane by means of guide ring 13. However, lever arms 8 are resiliently movable with respect of one another.

Figure 4A:
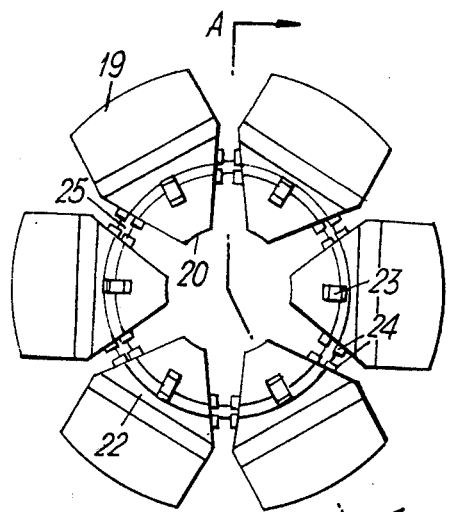
FIGS. 4a–4g illustrate various views of a third embodiment of a plurality of two-arm levers in accordance with the principles of the present invention which can be employed in a brake booster similar to the brake booster of FIG. 1.

The individual sector-shaped lever arms 19 of the reaction element of FIG. 4a are fine steel castings.

Figure 4F:
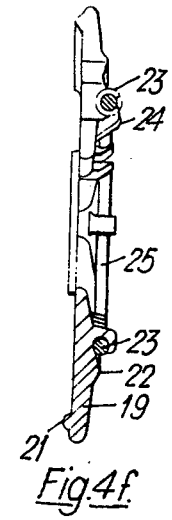
Figures 4E, 4G:
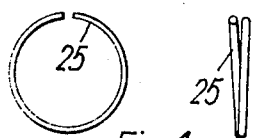
Figure 4B:
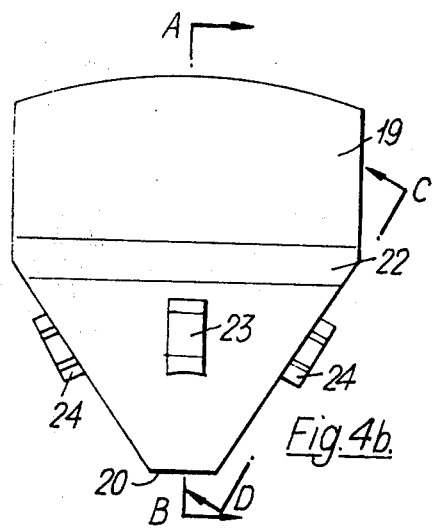
Figure 4D:
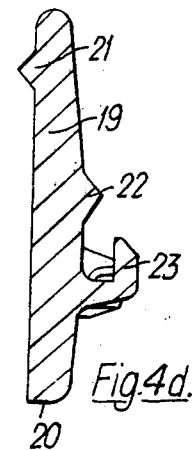

FIG. 4b illustrates one of these cast lever arms 19 enlarged. The truncated end 20 of the sector-shaped lever arm 19 here also forms the application point of the control piston. The application point of the boosting force and the balancing point of the lever arm 19 are formed by means of toruses 21 and 22 cast to the opposite sides at the relevant distance. This can be clearly seen from FIG. 4d which illustrates a section along the radial axis of the sector-shaped lever arm 19 of FIG. 4b.

As already described in view of FIG. 3a, the sector edges of the lever arm 19 proceed in a kinked manner. In the range of lever arm 19 between torus 22 and the truncated end 20 a hook-like projection 23 is cast to lever arm 19 while laterally at the inclined sector edges claw-like projections 24 are cast to lever arm 19 which are open in the direction of the sector plane.

Figure 4C:
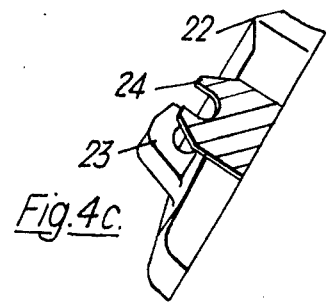

FIG. 4c illustrates a detail of sector-shaped lever arm 19 taken along line C–D of FIG. 4b. This detail particularly reveals the claw-like projection 24 and the hook-like projection 23.

Hook-like projection 23 and claw-like projections 24 of any sector-shaped lever arm 19 are situated on a circular arc corresponding to a retaining ring 25. The retaining ring 25 is illustrated in FIG. 4g and consists of a wire ring of spring steel which is slightly bent into a helical shape. For preassembling the reaction element of FIG. 4a said retaining ring 25 is inserted under hook-like projection 23 and into claw-like projection 24 of any sector-shaped lever arm 19 such as to achieve a safe support of sector-shaped lever arms 19 which, however, are still slightly movable. Note FIG. 4e.

FIG. 4f illustrates a sectional view through the preassembled inventive reaction element of FIG. 4a taken along the line A–B thereof and is kinked in the central portion.

Figure 5A:
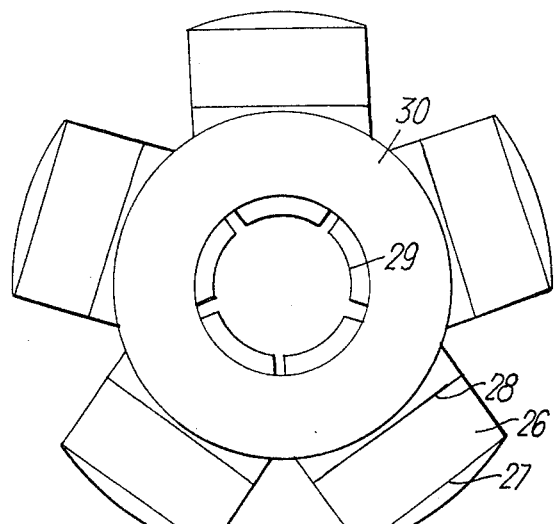
FIGS. 5a–5d illustrate various views of a fourth embodiment of a plurality of two-arm levers in accordance with the principles of the present invention which can be employed in a brake booster similar to the brake booster of FIG. 1.
Figure 5B:
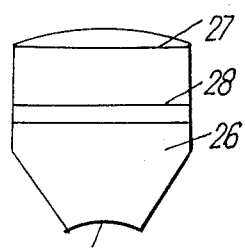
Figure 5C:
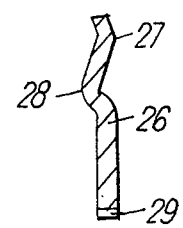

FIG. 5a illustrates the preassembled condition of a fourth embodiment of the invention. The sector-shaped lever arms 26 of FIG. 5b may be either cut from sectional bar while the knife-like shaped lever arms may be manufactured by means of grinding or they may be — as already described above — blanked from strip spring steel. The application point 27 of the boosting force and the balancing point 28 of lever arms 26 are formed by means of bulges pointing or directed in opposite directions. The application point of the control force here also is formed by the truncated end 29 of any sector-shaped lever arm 26. FIG. 5c illustrates a section through a sector-shaped lever arm 26 of FIG. 5b.

Figure 5D:
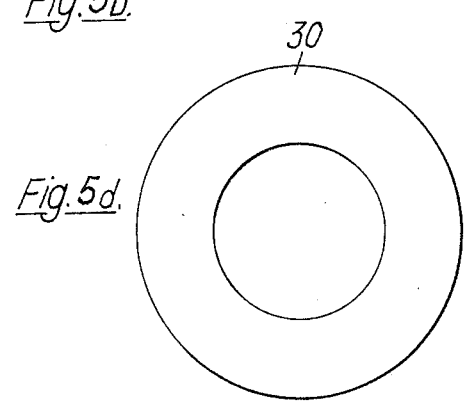

For the interconnection of the individual sector-shaped lever arm 26 — five in number in the illustrated embodiment — there is employed an annular foil 30 of FIG. 5d which may be of plastic, rubber or metal. The means of foil 30 the individual lever arms being integrated into one preassembled structural element. Annular foil 30 will be connected with lever arms 26 disposed in a circular plane by means of gluing, welding or the like.

A special advantage of this fourth embodiment of the invention consists in that the preassembled reaction elements on the annular foil 30 may be marked either by numbers, or different colors to identify their transmission ratios so that errors during assembly will be avoided.

The sector-shaped lever arms which according to the invention are preassembled into a reaction element will be held together as described according to several embodiments and can be thus stored. The assembly of the reaction element is considerably simplified since the reaction elements can be treated as one single structural element and, therefore, the lever arms need not be separately assembled as they had to be up to now. Assembly errors with respect to the transmission ratio, the outside and inside diameters being equal and the thicknesses of the elements being the same, are thus avoided. The elastic interconnection of the individual lever arms does not impair their operation.

Summing up, it is pointed out that especially the elastic connecting element can be varied and may be, for instance, a steel ring, a plastic ring or a rubber ring which is connected with the levers by means of buttoning, hooking, gluing or welding. The levers may be also manufactured of different material, such as, for instance, by means of blanking from spring steel, by means of casting from fine cast steel, or by means of shaping from plastic.

While we have described above the principles of our invention in connection with specific apparatus it is to be clearly understood that this description is made only by way of example and not as a limitation to the scope of our invention as set forth in the objects thereof and in the accompanying claims.

We claim:
1. A device for the transmission of forces in a brake booster comprising:
   a brake booster housing having a longitudinal axis;
   a control means disposed coaxially of said axis;
   a servo motor disposed coaxially of said axis and in a cooperative relation with said control means;
   a hydraulic system actuation device disposed coaxially of said axis; and
   a plurality of two-arm radially disposed levers disposed coaxially of said axis and in a cooperative contacting relationship with said control means, said servo motor and said actution device to sum up the control force of said control means and the boosting force of said servo motor and to transmit the resultant sum of said forces to said actuation device during an entire braking operation
   each arm of said plurality of two-arm levers being interconnected by an elastic connection at a point radially spaced from the outer edges of said arms to form a preassembled single structural element.
2. A device according to claim 1, wherein
   the point of applying said control force to each arm of said plurality of two-arm levers are disposed in a plane and on a first given circular arc in said plane;
   the point of applying said boosting force to each arm of said plurality of two-arm levers are disposed in said plane and on a second given circular arc in said plane different than said first given arc; and a balancing point for each arm of said plurality of two-arm levers is disposed in said plane and on a third given circular arc in said plane different than and between said first and second given arcs.

3. A device according to claim 2, wherein each arm of each of said plurality of two-arm levers are sector-shaped, the ends of each arm of each of said plurality of two-arm levers coupled to said control means are truncated, and the edges of each sector-shaped arm of each of said plurality of two-arm levers are bent in a predetermined direction a predetermined amount.

4. A device according to claim 3, wherein said elastic connection is disposed adjacent said balancing point of each arm of said plurality of two-arm levers.

5. A device according to claim 3, wherein said elastic connection is disposed between said balancing point and said point of applying control force of each arm of said plurality of two-arm levers.

6. A device according to claim 3, wherein said elastic connection includes a web interconnecting adjacent radial edges of each arm of said plurality of two-arm levers.

7. A device according to claim 6, wherein each arm of said plurality of two-arm levers and said web are one integral piece of strip spring steel, and said balancing point and said point of applying said boosting force of each arm of said plurality of two arm levers are each bulges, each of said bulges pointing in opposite directions.

8. A device according to claim 6, wherein each arm of said plurality of two-arm levers and said web are one integral piece of fine steel casting.

9. A device according to claim 6, wherein each arm of said plurality of two-arm levers and said web are one integral piece of plastic.

10. A device according to claim 3, wherein said elastic connection includes an annular connecting element, and each arm of said plurality of two-arm levers are interconnected by buttoning to said annular connecting element.

11. A device according to claim 10, wherein said annular connecting element includes fungiform projections disposed at regular intervals there around corresponding in number to the number of arms of said plurality of two-arm levers, and each arm of said plurality of two-arm levers include an aperture disposed on the radial axis thereof, said aperture being buttoned to said fungiform projections.

12. A device according to claim 11, wherein each of said fungiform projections include a slot in the outer surface thereof to provide elasticity for each of said fungiform projections.

13. A device according to claim 12, wherein each arm of said plurality of two arm levers are provided with circular cut outs on each edge thereof in the same arc as said apertures, and said annular connecting element further includes a plurality of plain projections disposed at regular intervals thereabout, and each of said plane projections engaging an associated one of said circular cut outs of adjacent ones of said arms of said plurality of two-arm levers.

14. A device according to claim 13, wherein said annular connecting element is plastic.

15. A device according to claim 14, wherein said plastic is polyamide.

16. A device according to claim 14, wherein each arm of said plurality of two-arm levers is strip spring steel.

17. A device according to claim 14, wherein each arm of said plurality of two-arm levers is plastic.

18. A device according to claim 14, wherein each arm of said plurality of two-arm levers is a fine steel casting.

19. A device according to claim 3, wherein said elastic connection is hooked to each arm of said plurality of two-arm levers.

20. A device according to claim 19, wherein each arm of said plurality of two-arm levers include a hook-like projection on the radial axis thereof, and said elastic connection includes a ring inserted into each of said hook-like projections.

21. A device according to claim 20, wherein said ring is slightly bent like a coil.

22. A device according to claim 20, wherein said ring is steel.

23. A device according to claim 20, wherein said ring is plastic.

24. A device according to claim 20, wherein each arm of said plurality of two-arm levers further include claw-like projections on each radial edge thereof in the same circular arc as said hook-like projections, and said ring is inserted into each of said claw-like and hook-like projections.

25. A device according to claim 24, wherein each of said claw-like projections are slightly compressed after insertion of said ring.

26. A device according to claim 19, wherein each arm of said plurality of two-arm levers are a fine steel casting, and said balancing point and said point of applying said boosting force of each arm of said plurality of two-arm levers are each a cast torus.

27. A device according to claim 19, wherein each arm of said plurality of two-arm levers are plastic, and said balancing point and said point of applying said boosting force of each arm of said plurality of two-arm levers are each a torus.

28. A device according to claim 3, wherein said elastic connection includes an annular foil secured to each arm of said plurality of two-arm levers.

29. A device according to claim 28, wherein said annular foil is welded to each arm of said plurality of two-arm levers.

30. A device according to claim 28, wherein said annular foil is glued to each arm of said plurality of two-arm levers.

31. A device according to claim 28, wherein said annular foil is plastic.

32. A device according to claim 28, wherein said annular foil is rubber.

33. A device according to claim 28, wherein said annular foil is metal.

34. A device according to claim 28, wherein said annular foil bears an identification mark.

35. A device according to claim 34, wherein said identification mark is a predetermined color.

* * * * *